(12) United States Patent
Li et al.

(10) Patent No.: US 12,414,129 B2
(45) Date of Patent: Sep. 9, 2025

(54) RESOURCE DETERMINING METHOD, RESOURCE INDICATION METHOD, AND DEVICE

(71) Applicant: VIVO MOBILE COMMUNICATION CO., LTD., Guangdong (CN)

(72) Inventors: Gen Li, Guangdong (CN); Zichao Ji, Guangdong (CN); Siqi Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 415 days.

(21) Appl. No.: 17/963,303

(22) Filed: Oct. 11, 2022

(65) Prior Publication Data

US 2023/0038092 A1 Feb. 9, 2023

Related U.S. Application Data

(63) Continuation of application No. PCT/CN2021/086790, filed on Apr. 13, 2021.

(30) Foreign Application Priority Data

Apr. 13, 2020 (CN) .......................... 202010287135.6

(51) Int. Cl.
*H04W 72/23* (2023.01)

(52) U.S. Cl.
CPC .................... *H04W 72/23* (2023.01)

(58) Field of Classification Search
CPC .............. H04W 72/23; H04W 72/232; H04W 72/0453; H04L 5/0005; H04L 5/001; H04L 5/0053; H04L 5/0094; H04L 27/26025
See application file for complete search history.

(56) References Cited

U.S. PATENT DOCUMENTS

| | | |
|---|---|---|
| 2013/0016655 A1 | 1/2013 | Heo et al. |
| 2016/0007373 A1 | 1/2016 | Davydov et al. |
| 2016/0073421 A1 | 3/2016 | Cui et al. |
| 2016/0100382 A1 | 4/2016 | He et al. |

(Continued)

FOREIGN PATENT DOCUMENTS

| | | |
|---|---|---|
| CN | 101909356 A | 12/2010 |
| CN | 104135355 A | 11/2014 |

(Continued)

OTHER PUBLICATIONS

Ericsson, "Summary of 7.1.3.1.4 (DCI contents and formats)", RI-1805572, TSG-RAN WG1 #92bis, Sanya, China, Apr. 16-20, 2018.

(Continued)

*Primary Examiner* — Abdullahi Ahmed
(74) *Attorney, Agent, or Firm* — Price Heneveld LLP (57) ABSTRACT

A resource determining method, a resource indication method, and a device are provided. The resource determining method is applied to a user-side device and includes: obtaining frequency-domain resource indication information of downlink control information DCI, where the frequency domain resource indication information supports scheduling of a plurality of carriers or bandwidth parts BWPs; and determining frequency-domain scheduling resources on the plurality of carriers or BWPs according to the frequency-domain resource indication information.

20 Claims, 4 Drawing Sheets

(56) References Cited

U.S. PATENT DOCUMENTS

| | | | |
|---|---|---|---|
| 2017/0346606 A1 | 11/2017 | Li et al. | |
| 2018/0115965 A1 | 4/2018 | Takeda et al. | |
| 2019/0149380 A1 | 5/2019 | Babaei et al. | |
| 2019/0312635 A1 | 10/2019 | Ang et al. | |
| 2020/0358586 A1 | 11/2020 | Takeda et al. | |
| 2020/0374848 A1* | 11/2020 | Zhang | H04W 72/23 |
| 2020/0374851 A1* | 11/2020 | Zhou | H04W 72/0453 |
| 2022/0217756 A1* | 7/2022 | Wu | H04L 1/1861 |
| 2023/0038092 A1 | 2/2023 | Li et al. | |
| 2023/0050298 A1 | 2/2023 | Li et al. | |
| 2023/0066709 A1* | 3/2023 | Li | H04L 5/0098 |
| 2023/0073686 A1* | 3/2023 | Li | H04L 5/0092 |
| 2023/0189301 A1* | 6/2023 | Zhao | H04W 72/40 |
| | | | 370/329 |

FOREIGN PATENT DOCUMENTS

| | | | |
|---|---|---|---|
| CN | 106416117 A | 2/2017 | |
| CN | 110740457 A | 1/2020 | |
| CN | 113543345 A | 10/2021 | |
| WO | 2016163503 A1 | 10/2016 | |
| WO | 2019138521 A1 | 7/2019 | |
| WO | 2021208878 A1 | 10/2021 | |

OTHER PUBLICATIONS

Ericsson, "New WID on NR Dynamic spectrum sharing (DSS)", RP-193260, 3GPP TSG RAN Meeting #86, Sitges, Spain, Dec. 9-12, 2019.

* cited by examiner

FIG. 5

RESOURCE DETERMINING METHOD, RESOURCE INDICATION METHOD, AND DEVICE

CROSS-REFERENCE TO RELATED APPLICATIONS

This application is continuation application of PCT International Application No. PCT/CN2021/086790 filed on Apr. 13, 2021, which claims priority to Chinese Patent Application No. 202010287135.6, filed in China on Apr. 13, 2020, which are incorporated herein by reference in their entireties.

TECHNICAL FIELD

The present application relates to the field of communications technologies, and in particular, to a resource determining method, a resource indication method, and a device.

BACKGROUND

With development of technologies, the new radio (NR) system has gradually become a mainstream direction in the communications field due to its characteristics of ultra-low latency and high reliability.

However, the current NR system is limited to scheduling only one carrier with one piece of downlink control information (DCI). In special scenarios such as a dynamic spectrum sharing (DSS) scenario, scheduling requires quite large physical downlink control channel (PDCCH) overheads.

SUMMARY

According to a first aspect, an embodiment of the present application further provides a resource determining method, applied to a user-side device and including:
obtaining frequency-domain resource indication information of downlink control information DCI, where the frequency domain resource indication information supports scheduling of a plurality of carriers or bandwidth parts BWPs; and
determining frequency-domain scheduling resources on the plurality of carriers or BWPs according to the frequency-domain resource indication information.

According to a second aspect, an embodiment of the present application further provides a resource indication method, applied to a network-side device and including:
generating downlink control information DCI carrying frequency-domain resource indication information, where the frequency domain resource indication information supports scheduling of a plurality of carriers or bandwidth parts BWPs; and
sending the DCI to a user-side device.

According to a third aspect, an embodiment of the present application further provides a user-side device, including:
an obtaining module, configured to obtain frequency-domain resource indication information of downlink control information DCI, where the frequency domain resource indication information supports scheduling of a plurality of carriers or bandwidth parts BWPs; and
a determining module, configured to determine frequency-domain scheduling resources on the plurality of carriers or BWPs according to the frequency-domain resource indication information.

According to a fourth aspect, an embodiment of the present application further provides a network-side device, including:
a generating module, configured to generate downlink control information DCI carrying frequency-domain resource indication information, where the frequency domain resource indication information supports scheduling of a plurality of carriers or bandwidth parts BWPs; and
a sending module, configured to send the DCI to a user-side device.

According to a fifth aspect, an embodiment of the present application further provides a communications device, including a processor, a memory, and a computer program stored in the memory and capable of running on the processor, where when the computer program is executed by the processor, the steps of the foregoing resource determining method are implemented or the steps of the foregoing resource indication method are implemented.

According to a sixth aspect, an embodiment of the present application further provides a computer-readable storage medium, where a computer program is stored in the computer-readable storage medium, and when the computer program is executed by a processor, the steps of the foregoing resource determining method are implemented or the steps of the foregoing resource indication method are implemented.

DESCRIPTION OF EMBODIMENTS

To make the objectives, technical solutions, and advantages of the present application clearer, the following provides descriptions with reference to accompanying drawings and specific embodiments.

A resource determining method in the embodiments of the present application is applied to user-side devices. The user-side device (user equipment, UE) may be an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, or a wearable device.

It should be known that, in the embodiments of the present application, a plurality of carriers or bandwidth parts (BWP) mean a plurality of carriers or a plurality of BWPs; each carrier or BWP means each carrier or each BWP; a plurality of carrier groups or BWP groups mean a plurality of carrier groups or a plurality of BWP groups; and a single carrier or BWP means a single carrier or a single BWP.

Figure 1:
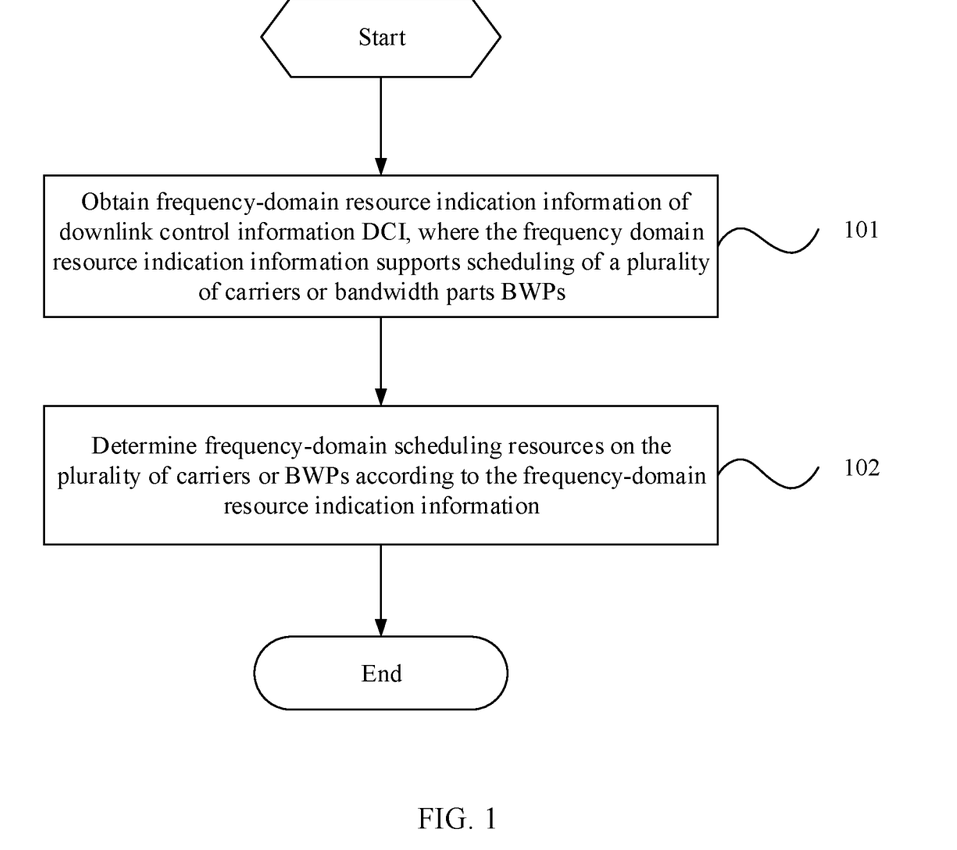
FIG. 1 is a flowchart of steps of a resource determining method according to an embodiment of the present application.

As shown in FIG. 1, a resource determining method in an embodiment of the present application is applied to a user-side device and includes:

Step 101: Obtain frequency-domain resource indication information of downlink control information DCI, where the frequency domain resource indication information supports scheduling of a plurality of carriers or bandwidth parts BWPs.

In this step, the frequency-domain resource indication information of the DCI supports scheduling of a plurality of carriers or BWPs, and can be also for scheduling a single carrier or BWP. Therefore, this step is performed to obtain the frequency-domain resource indication information of the DCI, so as to learn scheduling by the network-side device and further perform a next step.

Step 102: Determine frequency-domain scheduling resources on the plurality of carriers or BWPs according to the frequency-domain resource indication information.

In this step, after the frequency-domain resource indication information that supports scheduling of the plurality of carriers or BWPs is obtained in step 101, the frequency-domain scheduling resources on the plurality of carriers or BWPs corresponding to the frequency-domain resource indication information are determined according to the frequency-domain resource indication information.

Therefore, according to step 101 and step 102, after the user-side device to which the method in this embodiment of the present application is applied obtains the frequency-domain resource indication information of the DCI, the frequency-domain scheduling resources on the plurality of carriers or BWPs can be determined because the frequency-domain resource indication information supports scheduling of the plurality of carriers or BWPs. In this way, a plurality of carriers or BWPs can be scheduled by using one piece of DCI, effectively reducing PDCCH overheads in a scheduling process.

For example, in a DSS scenario, the network-side device generates and sends DCI carrying frequency-domain resource indication information. Because the frequency-domain resource indication information supports scheduling of a plurality of carriers or BWPs, the user-side device can obtain the frequency-domain resource indication information after receiving the DCI, so as to determine frequency-domain scheduling resources on the plurality of carriers or BWPs.

It should be known that information carried by the DCI is implemented by using a corresponding field. Therefore, optionally, in this embodiment, step 101 includes:

determining, based on configuration information of candidate resources scheduled by the DCI, that the frequency-domain resource indication information is in a corresponding first indicator field of the DCI; and obtaining the frequency-domain resource indication information based on the first indicator field.

Herein, the configuration information of the candidate resources scheduled by the DCI can be obtained in a manner such as configuration (such as higher-layer signaling configuration) or pre-definition, and the user-side device first determines, based on the configuration information, that the frequency-domain resource indication information is in the corresponding first indicator field of the DCI, and further obtains the frequency-domain resource indication information from the first indicator field.

Optionally, in the first indicator field, subfields corresponding to carriers or BWPs are arranged in an order of first identifiers; or high-order or low-order bits of subfields corresponding to carriers or BWPs are assigned for respective frequency-domain resource indicators.

The first identifier may be a cell identifier ID, or a carrier indicator CIF, or a BWP ID. Being arranged in an order of first identifiers may be being arranged in descending order or ascending order. In this case, the subfields corresponding to the carriers or BWPs in the first indicator field may have a same size or different sizes. In addition, in the first indicator field, preset positions, preferably high-order bits or low-order bits, of the subfields corresponding to the carriers or BWPs are assigned for respective frequency-domain resources. For example, the DCI schedules cell 1, and high-order bits of a subfield corresponding to cell 1 in the first indicator field are assigned for a frequency-domain resource indicator of cell 1. Assuming that the subfield corresponding to cell 1 in the first indicator field is 5 bits and the frequency-domain resource indicator of cell 1 requires only 2 bits, 2 high-order bits of the 5 bits corresponding to cell 1 in the first indicator field are used for the frequency-domain resource indicator of cell 1.

Optionally, in this embodiment, the determining, based on configuration information of candidate resources scheduled by the DCI, that the frequency-domain resource indication information is in a corresponding first indicator field of the DCI includes:

based on configuration information of carriers or BWPs in the candidate resources, obtaining sizes of second indicator fields corresponding to the carriers or BWPs; and determining a size of the first indicator field based on the sizes of the second indicator fields.

Optionally, the determining a size of the first indicator field based on the sizes of the second indicator fields includes:

using a sum of the sizes of all the second indicator fields as the size of the first indicator field; or using a size of a largest second indicator field in all the second indicator fields as the size of the first indicator field.

In this way, after the sizes of the second indicator fields corresponding to the carriers or BWPs are obtained based on the configuration information of the carriers or BWPs in the candidate resources, the sum of the sizes of all the second indicator fields is used as the size of the first indicator field. In other words, if frequency-domain resource allocation related fields of the carriers or BWPs scheduled by the DCI are independent, the subfields corresponding to the carriers or BWPs in the first indicator field are preferably arranged in the order of the first identifiers. Using the cell ID as an example and assuming that the DCI can schedule Cell 1 and Cell 2, and frequency-domain resource allocation related fields corresponding to Cell 1 and Cell 2 are obtained based on configurations of Cell 1 and Cell 2, that is, a size of a second indicator field corresponding to Cell 1 is $S_1$ and a size of a second indicator field corresponding to Cell 2 is $S_2$, the size of the first indicator field in the DCI is $S_1+S_2$, where the first $S_1$ bits in the first indicator field are a size of a subfield (which is a frequency-domain allocation related field) corresponding to Cell 1 and next $S_2$ bits are a size of a subfield corresponding to Cell 2.

In addition, the size of the largest second indicator field in all the second indicator fields may alternatively be used as the size of the first indicator field, that is, a frequency-domain resource allocation related field corresponding to the carriers or BWPs scheduled by the DCI is shared among the carriers or BWPs, and then preferably, high-order bits or low-order bits of the subfields corresponding to the carriers or BWPs in the first indicator field are assigned for respective frequency-domain resource indicators. Using the cell ID as an example and assuming that the DCI can schedule Cell 1 and Cell 2, and based on configurations of Cell 1 and Cell 2, an obtained size of a second indicator field corresponding to Cell 1 is $S_1$ and an obtained size of a second indicator field corresponding to Cell 2 is $S_2$, the size of the first indicator field in the DCI is $max(S_1, S_2)$, where in the first indicator field, high-order (or low-order) $S_1$ bits of a subfield corresponding to Cell 1 are assigned for its frequency-domain resource indicator and high-order (or low-order) $S_2$ bits of a subfield corresponding to Cell 2 are assigned for its frequency-domain resource indicator. Therefore, it is assumed that $S_1 > S_2$, the high-order $S_1$ bits of the subfield corresponding to Cell 1 are assigned for its frequency-domain resource indicator, and the low-order $S_2$ bits of the subfield corresponding to Cell 2 are assigned for its frequency-domain resource indicator. Then, in a case that the DCI schedules Cell 1, the size of the first indicator field in the DCI is $S_1$ bits, and high-order $S_1$ bits of the first indicator field are the frequency-domain resource indicator of Cell 1; and in a case that the DCI schedules Cell 2, the size of the first indicator field in the DCI is $S_1$ bits, and low-order $S_2$ bits in the $S_1$ bits are the frequency-domain resource indicator of Cell 2. Certainly, high-order bits or low-order bits of all the subfields corresponding to the carriers or BWPs in the first indicator field can be assigned for respective frequency-domain resource indicators. Exemplarily, for DCI scheduling downlink data, the first indicator field includes a frequency-domain resource allocation (FDRA) field and/or a virtual resource block (VRB)-to-physical resource block (PRB) indicator field. For DCI scheduling uplink data, the first indicator field includes an FDRA field and/or a frequency hopping indicator field.

In addition, considering that the candidate resources include a plurality of carrier groups or BWP groups, for the plurality of carrier groups or BWP groups, optionally, the determining, based on configuration information of candidate resources scheduled by the DCI, that the frequency-domain resource indication information is in a corresponding first indicator field of the DCI includes: in a case that the candidate resource includes a plurality of carrier groups or BWP groups, obtaining, based on configuration information of the plurality of carrier groups or BWP groups, sizes of third indicator fields corresponding to the carrier groups or BWP groups; and determining a size of the first indicator field based on the sizes of the third indicator fields.

Optionally, the determining a size of the first indicator field based on the sizes of the third indicator fields includes:
using a size of a largest third indicator field in all the third indicator fields as the size of the first indicator field; or
obtaining the size L of the first indicator field according to a formula $L=S_{MAX}*N$, where $S_{MAX}$ is a size of a largest single-carrier or single-BWP indicator field in the plurality of carrier groups or BWP groups, and N is the largest number of carriers or BWPs in the plurality of carrier groups or BWP groups in the candidate resources; or using a size of a largest single-carrier or single-BWP indicator field in the plurality of carrier groups or BWP groups as the size of the first indicator field.

In this way, after the sizes of the third indicator fields corresponding to the carrier groups or BWP groups are obtained based on the configuration information of the plurality of carrier groups or BWP groups, the size of the largest third indicator field in all the third indicator fields can be used as the size of the first indicator field. When DCI of a same size can schedule a plurality of carrier groups or BWP groups, subfields corresponding to carriers or BWPs in the first indicator field can be arranged in an order of the first identifiers. If the first indicator field has remaining bits after sorting, the remaining bits are invalid bits and can be set to all zeros. Alternatively, high-order bits or low-order bits of the subfields corresponding to the carriers or BWPs in the first indicator field are assigned to respective frequency-domain resource indicators.

For example, the DCI can schedule carrier group 1 (including Cell 1 and Cell 2) and carrier group 2 (including Cell 3 and Cell 4), and based on configuration information of the two carrier groups, an obtained size of a third indicator field corresponding to carrier group 1 is 5 bits (2 bits for Cell 1 and 3 bits for Cell 2), and an obtained size of a third indicator field corresponding to carrier group 2 is 10 bits (4 bits for Cell 3 and 6 bits for Cell 4), the size of the first indicator field is 10 bits. Therefore, if the subfields corresponding to the carriers or BWPs in the first indicator field are arranged in the order of the first identifiers, for carrier group 1, the first 2 bits of the first indicator field are subfields corresponding to Cell 1, and next 3 bits are subfields corresponding to Cell 2; and for carrier group 2, the first 4 bits of the first indicator field are subfields corresponding to Cell 3, and next 6 bits are subfields corresponding to Cell 4. In this way, when the DCI schedules Cell 1 and Cell 2, the first 2 bits in the 10 bits of the first indicator field of DCI are the subfields corresponding to Cell 1 (used for scheduling of Cell 1), next 3 bits are the subfields corresponding to Cell 2, and the last 5 bits are invalid bits and can be set to all zeros.

In addition, the size of the largest single-carrier or single-BWP indicator field in the plurality of carrier groups or BWP groups may alternatively be used as the size of the first indicator field. Sizes of frequency-domain resource allocation related fields (that is, single-carrier or single-BWP indicator fields) required by the carriers or BWPs in the plurality of carrier groups or BWP groups that can be scheduled by the DCI are $S_1, S_2, \ldots,$ and $S_K$, where K is the total number of all carriers or BWPs in the plurality of carrier groups or BWP groups that can be scheduled by the DCI. In this case, the size of the first indicator field is $S_{MAX}$, where $S_{MAX}=max(S_1, S_2, \ldots, S_K)$. When DCI of a same size can schedule a plurality of carrier groups or BWP groups, high-order or low-order bits of the subfields corresponding to the carriers or BWPs in the first indicator field are preferably assigned to respective frequency-domain resource indicators. For example, the DCI can schedule carrier group 1 (including Cell 1 and Cell 2) and carrier group 2 (including Cell 3 and Cell 4). Based on configuration information of carriers or BWPs, 2 bits is obtained for Cell 1, 3 bits for Cell 2, 4 bits for Cell 3, and 6 bits for Cell 4; and therefore the size of the first indicator field is 6 bits. Assuming that high-order bits of the subfields corresponding to the carriers or BWPs in the first indicator field are assigned for respective frequency-domain resource indicators, when the DCI schedules Cell 1 and Cell 2, the first 2 bits of the 6 bits in the first indicator field of the DCI are subfields corresponding to Cell 1, next 3 bits are subfields corresponding to Cell 2, and the last 1 bit is an invalid bit and can be set to zero.

Alternatively, the size L of the first indicator field is obtained according to the formula $L=S_{MAX}*N$, where N is the largest number of carriers or BWPs in the plurality of carrier groups or BWP groups in the candidate resources. When DCI of a same size can schedule a plurality of carrier groups or BWP groups, subfields corresponding to carriers or BWPs in the first indicator field are arranged in an order of first identifiers, where sizes of the subfields corresponding to the carriers or BWPs are all $S_{MAX}$ bits, and high-order $S_1$ bits or low-order $S_1$ bits of each $S_{MAX}$ bit correspond to the i-th carrier or BWP. In addition, the subfields corresponding to the carriers or BWPs in the first indicator field may alternatively have different sizes, and a subfield size corresponding to each carrier or BWP is equal to a size of its frequency-domain resource indicator.

For example, the DCI can schedule carrier group 1 (including Cell 1 and Cell 2) and carrier group 2 (including Cell 3 and Cell 4). Based on configuration information of carriers or BWPs, 2 bits is obtained for Cell 1, 3 bits for Cell 2, 4 bits for Cell 3, and 6 bits for Cell 4; and therefore the size of the first indicator field is 10 bit*2=20 bit. Sub-fields corresponding to carriers or BWPs in the first indicator field are arranged in an order of first identifiers. In this case, when the DCI schedules Cell 1 and Cell 2, the first 10 bits in the 20 bits of the first indicator field in the DCI are subfields corresponding to Cell 1 and the last 10 bits are subfields corresponding to Cell 2, and only high-order 2 bits or low-order 2 bits in the first 10 bits are used to indicate a frequency-domain resource of Cell 1 and only high-order 3 bits or low-order 3 bits in the last 10 bits are used to indicate a frequency-domain resource of Cell 2; or, in the 20 bits of the first indicator field of the DCI, continuous bits may be used to indicate frequency-domain resources of the cells, and a subfield corresponding to each cell directly indicates a frequency-domain resource of the cell, so that the first 2 bits of the 20 bits are the subfields corresponding to Cell 1 to directly indicate a frequency-domain resource of Cell 1, next 3 bits are the subfields corresponding to Cell 2 to indicate a frequency-domain resource of Cell 2. In this way, the last 15 bits are invalid bits and can be set to all zeros.

Optionally, in this embodiment, the determining, based on configuration information of candidate resources scheduled by the DCI, that the frequency-domain resource indication information is in a corresponding first indicator field of the DCI includes:

based on whether the DCI is for single-carrier or single-BWP scheduling, selecting a size of the first indicator field according to a preset policy.

Optionally, the preset policy includes:

in a case that the DCI is for single-carrier or single-BWP scheduling, obtaining the size of the first indicator field based on configuration information of a scheduled carrier or BWP; and in a case that the DCI is not for single-carrier or single-BWP scheduling, obtaining, based on configuration information of a plurality of carrier groups or BWP groups in the candidate resources, sizes of fourth indicator fields corresponding to carrier groups or BWP groups, and using a size of a largest fourth indicator field in all the fourth indicator fields as the size of the first indicator field; or using a size of a largest single-carrier or single-BWP indicator field in a plurality of carrier groups or BWP groups as the size of the first indicator field; or obtaining a size L' of the first indicator field according to a formula $L'=S'_{MAX}*N$, where $S'_{MAX}$ is a size of a largest single-carrier or single-BWP indicator field in the plurality of carrier groups or BWP groups, and N is the largest number of carriers or BWPs in the plurality of carrier groups or BWP groups in the candidate resources.

In this way, for the DCI for single-carrier or single-BWP scheduling, the size of the first indicator field is obtained based on the configuration information of the scheduled carrier or BWP. For example, the size of the first indicator field is equal to a size $S_{single}$ that is of an indicator field of the scheduled carrier or BWP and that is obtained based on the configuration information. For the DCI not for single-carrier or single-BWP scheduling, after the sizes of the fourth indicator fields corresponding to the carrier groups or BWP groups are obtained based on the configuration information of the plurality of carrier groups or BWP groups in the candidate resources, the size of the largest fourth indicator field in all the fourth indicator fields may be used as the size of the first indicator field; or the size of the largest single-carrier or single-BWP indicator field in the plurality of carrier groups or BWP groups is used as the size of the first indicator field; or the size L' of the first indicator field is obtained according to the formula $L'=S'_{MAX}*N$.

Herein, implementation of determining the first indicator field of the DCI that is not for single-carrier or single-BWP scheduling is similar to the foregoing implementation of determining the size of the first indicator field based on to the sizes of the third indicator fields, and details are not repeated herein.

In addition, considering that an excessively large size of the first indicator field may lead to consumption of more resources for DCI transmission, optionally, in this embodiment, the network-side device may reduce the frequency-domain resource indication information. Relatively, the obtaining the frequency-domain resource indication information based on the first indicator field includes:

reducing the first indicator field based on a first threshold to obtain a fifth indicator field; and obtaining the frequency-domain resource indication information from the fifth indicator field.

Herein, the first threshold is obtained in a manner such as configuration (such as higher-layer signaling configuration) or pre-definition. The user-side device reduces the first indicator field based on the first threshold (for example, ½) to obtain the fifth indicator field, and then the frequency-domain resource indication information may be obtained from the fifth indicator field.

Optionally, an allocation granularity of the frequency-domain scheduling resource is doubled with respect to the first threshold.

That is, reduction of the first indicator field is implemented by doubling the allocation granularity of the frequency-domain scheduling resource, and with respect to the first threshold, doubling is implemented based on a reciprocal of the first threshold. Certainly, the allocation granularity of the frequency-domain scheduling resource may be doubled by using a second threshold, where the second threshold is a reciprocal of the first threshold. For example, for a Type 0 (non-contiguous frequency-domain resource allocation) frequency-domain resource allocation mode, a resource block group size RBG size is doubled (for example, 2 times) based on an RRC-configured granularity, so that the required number of bitmaps becomes ½. For a Type 1 (contiguous frequency-domain resource allocation) frequency-domain resource allocation mode, every multiple (for example, 2) consecutive RBs are considered as one virtual RB for resource allocation, so that the number of required frequency domain allocation bits is reduced to ½. Optionally, for interleaving indication or frequency hopping indication, the interleaving mode or frequency hopping mode may not be supported by default, that is, when the DCI schedules more than one carrier or BWP, the interleaving or frequency hopping indication is not available.

Optionally, in this embodiment, the frequency-domain resource indication information includes:
- a second identifier and/or an offset value, where the second identifier is an indication identifier of a frequency-domain resource.

In this way, when the frequency-domain resource indication information of the DCI is shared among the carriers or BWPs, a plurality of frequency-domain resource indication identifiers can be configured, and frequency-domain resources are indicated by using specific indication identifiers and/or offset values.

For example, a second identifier group of frequency-domain resource indication information of a plurality of cells can be configured. If the plurality of cells are Cell 1 and Cell 2, when Type 1 resource allocation is configured for all active BWPs on Cell 1 and Cell 2, 3 bits are required to indicate a RIV (that is, a PRB group in frequency domain) of Cell 1, 2 bits are required to indicate a RIV of Cell 2, and then a field of the frequency-domain resource indication information in the DCI is 3 bits. Frequency-domain resource indication identifiers corresponding to Cell 1 RIV and Cell 2 RIV are shown in Table 1 below.

TABLE 1

| Second identifier | Cell 1 RIV | Cell 2 RIV |
| --- | --- | --- |
| 0 | 0 | 0 |
| 1 | 1 | 1 |
| 2 | 2 | 2 |
| 3 | 3 | 3 |
| 4 | 4 | 0 |
| 5 | 5 | 1 |
| 6 | 6 | 2 |
| 7 | 7 | 3 |

Certainly, in the field of the frequency-domain resource indication information in the DCI, low-order 2 bits may be used to indicate frequency-domain resource allocation of Cell 2.

In order to implement more flexible configuration combinations for a base station, the base station can configure a combination indicated in the table above (in this case, a size of the field may depend on the number of configuration combinations) or configures an offset value, as shown in Table 2 below.

TABLE 2

| Second identifier | Cell 1 RIV | Cell 2 RIV |
| --- | --- | --- |
| 0 | (0 + offset1) mod 8 | (0 + offset2) mod 4 |
| 1 | (1 + offset1) mod 8 | (1 + offset2) mod 4 |
| 2 | (2 + offset1) mod 8 | (2 + offset2) mod 4 |
| 3 | (3 + offset1) mod 8 | (3 + offset2) mod 4 |
| 4 | (4 + offset1) mod 8 | (0 + offset2) mod 4 |
| 5 | (5 + offset1) mod 8 | (1 + offset2) mod 4 |
| 6 | (6 + offset1) mod 8 | (2 + offset2) mod 4 |
| 7 | (7 + offset1) mod 8 | (3 + offset2) mod 4 |

Only one of offset1 and offset2 can be configured, and the other not configured is set to 0 by default. For example, offset1 is configured and offset2 is set to 0 by default.

In addition, optionally, the user-side device does not expect at least one of the following:
- carriers or BWPs in the candidate resources have different subcarrier spacings (SCS);
- carriers or BWPs in the candidate resources have different frequency-domain allocation modes;
- carriers or BWPs in the candidate resources have different bandwidths or different quantities of physical resource blocks PRBs;
- carriers or BWPs in the candidate resources have different virtual resource block VRB to PRB pattern configurations; or
- carriers or BWPs in the candidate resources scheduled by the DCI have different frequency hopping pattern configurations.

To sum up, after the frequency-domain resource indication information of the DCI is obtained, the frequency-domain scheduling resources on the plurality of carriers or BWPs can be determined because the frequency-domain resource indication information supports scheduling of the plurality of carriers or BWPs. In this way, a plurality of carriers or BWPs can be scheduled by using one piece of DCI, effectively reducing PDCCH overheads in a scheduling process.

Figure 2:
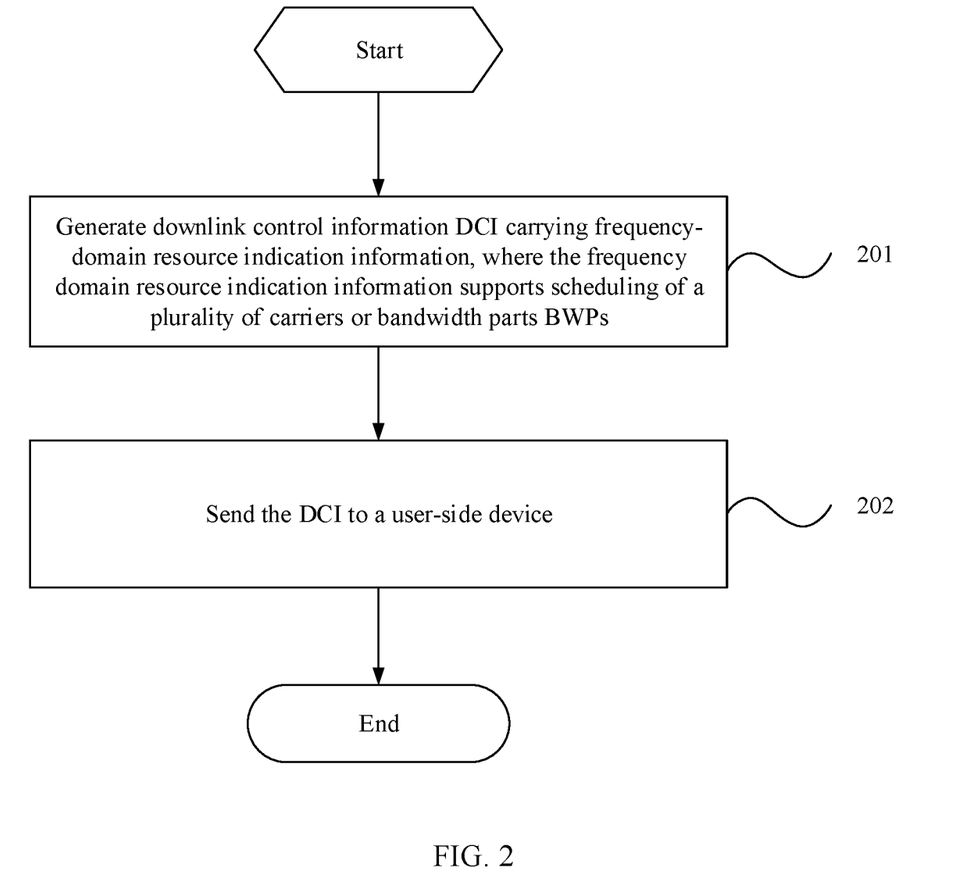
FIG. 2 is a flowchart of steps of a resource indication method according to an embodiment of the present application.

As shown in FIG. 2, a resource indication method in an embodiment of the present application is applied to a network-side device and includes:

Step 201: Generate downlink control information DCI carrying frequency-domain resource indication information, where the frequency domain resource indication information supports scheduling of a plurality of carriers or bandwidth parts BWPs.

Step 202: Send the DCI to a user-side device.

According to step 201 and step 202, after the network-side device in this embodiment of the present application generates the DCI carrying the frequency-domain resource indication information, and sends the DCI to the user-side device, the user-side device can determine frequency-domain scheduling resources on the plurality of carriers or BWPs because the frequency-domain resource indication information supports scheduling of the plurality of carriers or BWPs. In this way, a plurality of carriers or BWPs can be scheduled by using one piece of DCI, effectively reducing PDCCH overheads in a scheduling process.

Optionally, step 201 includes:
- determining, based on configuration information of candidate resources scheduled by the DCI, that the frequency-domain resource indication information is in a corresponding first indicator field of the DCI; and
- obtaining, based on the first indicator field, the DCI carrying the frequency-domain resource indication information.

Optionally, the determining, based on configuration information of candidate resources scheduled by the DCI, that the frequency-domain resource indication information is in a corresponding first indicator field of the DCI includes:
- based on configuration information of carriers or BWPs in the candidate resources, obtaining sizes of second indicator fields corresponding to the carriers or BWPs; and
- determining a size of the first indicator field based on the sizes of the second indicator fields.

Optionally, the determining a size of the first indicator field based on the sizes of the second indicator fields includes:
- using a sum of the sizes of all the second indicator fields as the size of the first indicator field; or using a size of a largest second indicator field in all the second indicator fields as the size of the first indicator field.

Optionally, the determining, based on configuration information of candidate resources scheduled by the DCI, that the frequency-domain resource indication information is in a corresponding first indicator field of the DCI includes:

in a case that the candidate resource includes a plurality of carrier groups or BWP groups, obtaining, based on configuration information of the plurality of carrier groups or BWP groups, sizes of third indicator fields corresponding to the carrier groups or BWP groups; and determining a size of the first indicator field based on the sizes of the third indicator fields.

Optionally, the determining a size of the first indicator field based on the sizes of the third indicator fields includes:

using a size of a largest third indicator field in all the third indicator fields as the size of the first indicator field; or obtaining the size L of the first indicator field according to a formula $L=S_{MAX}*N$, where $S_{MAX}$ is a size of a largest single-carrier or single-BWP indicator field in the plurality of carrier groups or BWP groups, and N is the largest number of carriers or BWPs in the plurality of carrier groups or BWP groups in the candidate resources; or using a size of a largest single-carrier or single-BWP indicator field in the plurality of carrier groups or BWP groups as the size of the first indicator field.

Optionally, the determining, based on configuration information of candidate resources scheduled by the DCI, that the frequency-domain resource indication information is in a corresponding first indicator field of the DCI includes:

based on whether the DCI is for single-carrier or single-BWP scheduling, selecting a size of the first indicator field according to a preset policy.

Optionally, the preset policy includes:

in a case that the DCI is for single-carrier or single-BWP scheduling, obtaining the size of the first indicator field based on configuration information of a scheduled carrier or BWP; and in a case that the DCI is not for single-carrier or single-BWP scheduling, obtaining, based on configuration information of a plurality of carrier groups or BWP groups in the candidate resources, sizes of fourth indicator fields corresponding to carrier groups or BWP groups, and using a size of a largest fourth indicator field in all the fourth indicator fields as the size of the first indicator field; or using a size of a largest single-carrier or single-BWP indicator field in a plurality of carrier groups or BWP groups as the size of the first indicator field; or obtaining a size L' of the first indicator field according to a formula $L'=S'_{MAX}*N$, where $S'_{MAX}$ is a size of a largest single-carrier or single-BWP indicator field in the plurality of carrier groups or BWP groups, and N is the largest number of carriers or BWPs in the plurality of carrier groups or BWP groups in the candidate resources.

Optionally, in the first indicator field, subfields corresponding to carriers or BWPs are arranged in an order of first identifiers; or high-order or low-order bits of subfields corresponding to carriers or BWPs are assigned for respective frequency-domain resource indicators.

Optionally, the obtaining, based on the first indicator field, the DCI carrying the frequency-domain resource indication information includes:

reducing the first indicator field based on a first threshold to obtain a fifth indicator field; and adding the frequency-domain resource indication information to the fifth indicator field.

Optionally, an allocation granularity of the frequency-domain scheduling resource of the DCI is doubled with respect to the first threshold.

Optionally, the frequency-domain resource indication information includes:

a second identifier and/or an offset value, where the second identifier is an indication identifier of a frequency-domain resource.

Optionally, the user-side device does not expect at least one of the following:

carriers or BWPs in the candidate resources have different subcarrier spacings SCSs;

carriers or BWPs in the candidate resources have different frequency-domain allocation modes;

carriers or BWPs in the candidate resources have different bandwidths or different quantities of physical resource blocks PRBs;

carriers or BWPs in the candidate resources have different virtual resource block VRB to PRB pattern configurations; or carriers or BWPs in the candidate resources have different frequency hopping pattern configurations.

It should be noted that the resource indication method is implemented in cooperation with the resource determining method, and implementations in the embodiment of the resource determining method are also applicable to this method, with the same technical effects achieved.

Figure 3:
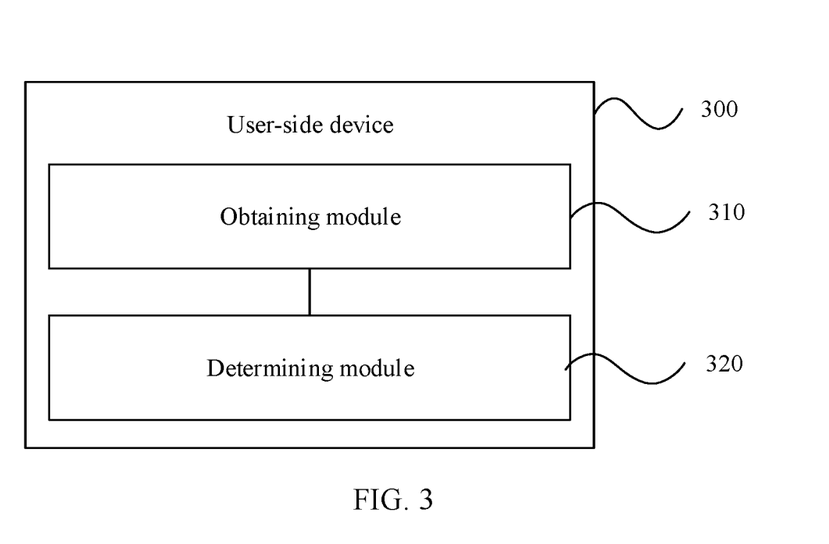
FIG. 3 is a schematic structural diagram of a user-side device according to an embodiment of the present application.

FIG. 3 is a block diagram of a user-side device according to an embodiment of the present application. The user-side device 300 shown in FIG. 3 includes an obtaining module 310 and a determining module 320.

The obtaining module 310 is configured to obtain frequency-domain resource indication information of downlink control information DCI, where the frequency domain resource indication information supports scheduling of a plurality of carriers or bandwidth parts BWPs.

The determining module 320 is configured to determine frequency-domain scheduling resources on the plurality of carriers or BWPs according to the frequency-domain resource indication information.

Optionally, the obtaining module 310 includes:

a first processing submodule, configured to determine, based on configuration information of candidate resources scheduled by the DCI, that the frequency-domain resource indication information is in a corresponding first indicator field of the DCI; and a second processing submodule, configured to obtain the frequency-domain resource indication information based on the first indicator field.

Optionally, the first processing submodule includes:

a first processing unit, configured to: based on configuration information of carriers or BWPs in the candidate resources, obtain sizes of second indicator fields corresponding to the carriers or BWPs; and a second processing unit, configured to determine a size of the first indicator field based on the sizes of the second indicator fields.

Optionally, the second processing unit is further configured to:

use a sum of the sizes of all the second indicator fields as the size of the first indicator field; or use a size of a largest second indicator field in all the second indicator fields as the size of the first indicator field.

Optionally, the first processing submodule includes:
a third processing unit, configured to: in a case that the candidate resource includes a plurality of carrier groups or BWP groups, obtain, based on configuration information of the plurality of carrier groups or BWP groups, sizes of third indicator fields corresponding to the carrier groups or BWP groups; and
a fourth processing unit, configured to determine a size of the first indicator field based on the sizes of the third indicator fields.

Optionally, the fourth processing unit is further configured to:
use a size of a largest third indicator field in all the third indicator fields as the size of the first indicator field; or
obtain the size L of the first indicator field according to a formula $L=S_{MAX}*N$, where $S_{MAX}$ is a size of a largest single-carrier or single-BWP indicator field in the plurality of carrier groups or BWP groups, and N is the largest number of carriers or BWPs in the plurality of carrier groups or BWP groups in the candidate resources; or
use a size of a largest single-carrier or single-BWP indicator field in the plurality of carrier groups or BWP groups as the size of the first indicator field.

Optionally, the first processing submodule includes:
a fifth processing unit, configured to: based on whether the DCI is for single-carrier or single-BWP scheduling, select a size of the first indicator field according to a preset policy.

Optionally, the preset policy includes:
in a case that the DCI is for single-carrier or single-BWP scheduling, obtaining the size of the first indicator field based on configuration information of a scheduled carrier or BWP; and
in a case that the DCI is not for single-carrier or single-BWP scheduling, obtaining, based on configuration information of a plurality of carrier groups or BWP groups in the candidate resources, sizes of fourth indicator fields corresponding to carrier groups or BWP groups, and using a size of a largest fourth indicator field in all the fourth indicator fields as the size of the first indicator field; or using a size of a largest single-carrier or single-BWP indicator field in a plurality of carrier groups or BWP groups as the size of the first indicator field; or obtaining a size L' of the first indicator field according to a formula $L'=S'_{MAX}*N$, where $S'_{MAX}$ is a size of a largest single-carrier or single-BWP indicator field in the plurality of carrier groups or BWP groups, and N is the largest number of carriers or BWPs in the plurality of carrier groups or BWP groups in the candidate resources.

Optionally, in the first indicator field, subfields corresponding to carriers or BWPs are arranged in an order of first identifiers; or
high-order or low-order bits of subfields corresponding to carriers or BWPs are assigned for respective frequency-domain resource indicators.

Optionally, the second processing submodule further includes:
a sixth processing unit, configured to reduce the first indicator field based on a first threshold to obtain a fifth indicator field; and
a seventh processing unit, configured to obtain the frequency-domain resource indication information from the fifth indicator field.

Optionally, an allocation granularity of the frequency-domain scheduling resource is doubled with respect to the first threshold.

Optionally, the frequency-domain resource indication information includes:
a second identifier and/or an offset value, where the second identifier is an indication identifier of a frequency-domain resource.

Optionally, the user-side device does not expect at least one of the following:
carriers or BWPs in the candidate resources have different subcarrier spacings SCSs;
carriers or BWPs in the candidate resources have different frequency-domain allocation modes;
carriers or BWPs in the candidate resources have different bandwidths or different quantities of physical resource blocks PRBs;
carriers or BWPs in the candidate resources have different virtual resource block VRB to PRB pattern configurations; or
carriers or BWPs in the candidate resources scheduled by the DCI have different frequency hopping pattern configurations.

The user-side device 300 is capable of implementing the processes implemented by the user-side device in the method embodiment in FIG. 1. To avoid repetition, details are not described herein again. After the user-side device in this embodiment of the present application obtains the frequency-domain resource indication information of the DCI, the frequency-domain scheduling resources on the plurality of carriers or BWPs can be determined because the frequency-domain resource indication information supports scheduling of the plurality of carriers or BWPs. In this way, a plurality of carriers or BWPs can be scheduled by using one piece of DCI, effectively reducing PDCCH overheads in a scheduling process.

Figure 4:
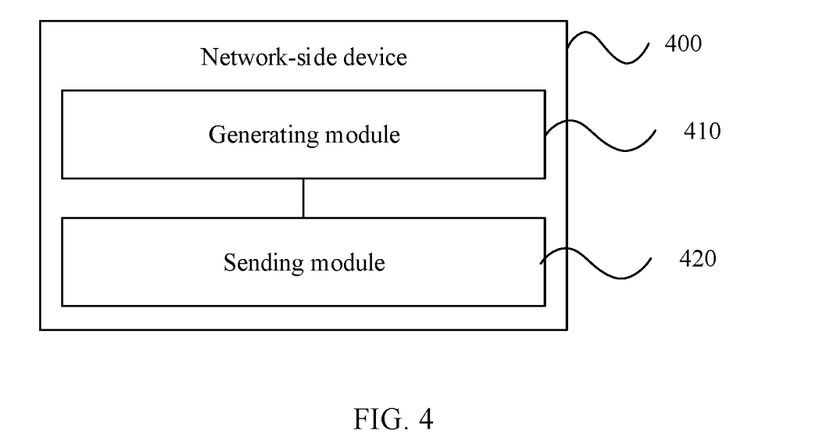
FIG. 4 is a schematic structural diagram of a network-side device according to an embodiment of the present application.

FIG. 4 is a block diagram of a network-side device according to an embodiment of the present application. The network-side device 400 shown in FIG. 4 includes a generating module 410 and a sending module 420.

The generating module 410 is configured to generate downlink control information DCI carrying frequency-domain resource indication information, where the frequency domain resource indication information supports scheduling of a plurality of carriers or bandwidth parts BWPs.

The sending module 420 is configured to send the DCI to a user-side device.

Optionally, the generating module includes:
a third processing submodule, configured to determine, based on configuration information of candidate resources scheduled by the DCI, that the frequency-domain resource indication information is in a corresponding first indicator field of the DCI; and
a fourth processing submodule, configured to obtain, based on the first indicator field, the DCI carrying the frequency-domain resource indication information.

Optionally, the third processing submodule includes:
an eighth processing unit, configured to: based on configuration information of carriers or BWPs in the candidate resources, obtain sizes of second indicator fields corresponding to the carriers or BWPs; and
a ninth processing unit, configured to determine a size of the first indicator field based on the sizes of the second indicator fields.

Optionally, the ninth processing unit is further configured to:
use a sum of the sizes of all the second indicator fields as the size of the first indicator field; or
use a size of a largest second indicator field in all the second indicator fields as the size of the first indicator field.

Optionally, the third processing submodule includes:
a tenth processing unit, configured to: in a case that the candidate resource includes a plurality of carrier groups or BWP groups, obtain, based on configuration information of the plurality of carrier groups or BWP groups, sizes of third indicator fields corresponding to the carrier groups or BWP groups; and
an eleventh processing unit, configured to determine a size of the first indicator field based on the sizes of the third indicator fields.

Optionally, the eleventh processing unit is further configured to:
use a size of a largest third indicator field in all the third indicator fields as the size of the first indicator field; or
obtain the size L of the first indicator field according to a formula $L=S_{MAX}*N$, where $S_{MAX}$ is a size of a largest single-carrier or single-BWP indicator field in the plurality of carrier groups or BWP groups, and N is the largest number of carriers or BWPs in the plurality of carrier groups or BWP groups in the candidate resources; or
use a size of a largest single-carrier or single-BWP indicator field in the plurality of carrier groups or BWP groups as the size of the first indicator field.

Optionally, the third processing submodule includes:
a twelfth processing unit, configured to: based on whether the DCI is for single-carrier or single-BWP scheduling, select a size of the first indicator field according to a preset policy.

Optionally, the preset policy includes:
in a case that the DCI is for single-carrier or single-BWP scheduling, obtaining the size of the first indicator field based on configuration information of a scheduled carrier or BWP; and
in a case that the DCI is not for single-carrier or single-BWP scheduling, obtaining, based on configuration information of a plurality of carrier groups or BWP groups in the candidate resources, sizes of fourth indicator fields corresponding to carrier groups or BWP groups, and using a size of a largest fourth indicator field in all the fourth indicator fields as the size of the first indicator field; or using a size of a largest single-carrier or single-BWP indicator field in a plurality of carrier groups or BWP groups as the size of the first indicator field; or obtaining a size L' of the first indicator field according to a formula $L'=S'_{MAX}*N$, where $S'_{MAX}$ is a size of a largest single-carrier or single-BWP indicator field in the plurality of carrier groups or BWP groups, and N is the largest number of carriers or BWPs in the plurality of carrier groups or BWP groups in the candidate resources.

Optionally, in the first indicator field, subfields corresponding to carriers or BWPs are arranged in an order of first identifiers; or
high-order or low-order bits of subfields corresponding to carriers or BWPs are assigned for respective frequency-domain resource indicators.

Optionally, the fourth processing submodule includes:
a thirteenth processing unit, configured to reduce the first indicator field based on a first threshold to obtain a fifth indicator field; and
a fourteenth processing unit, configured to add the frequency-domain resource indication information to the fifth indicator field.

Optionally, an allocation granularity of the frequency-domain scheduling resource of the DCI is doubled with respect to the first threshold.

Optionally, the frequency-domain resource indication information includes:
a second identifier and/or an offset value, where the second identifier is an indication identifier of a frequency-domain resource.

Optionally, the user-side device does not expect at least one of the following:
carriers or BWPs in the candidate resources have different subcarrier spacings SCSs;
carriers or BWPs in the candidate resources have different frequency-domain allocation modes;
carriers or BWPs in the candidate resources have different bandwidths or different quantities of physical resource blocks PRBs;
carriers or BWPs in the candidate resources have different virtual resource block VRB to PRB pattern configurations; or
carriers or BWPs in the candidate resources have different frequency hopping pattern configurations.

The network-side device 400 is capable of implementing the processes implemented by the network-side device in the method embodiment in FIG. 2. To avoid repetition, details are not described herein again. After the network-side device in this embodiment of the present application generates the DCI carrying the frequency-domain resource indication information, and sends the DCI to the user-side device, the user-side device can determine frequency-domain scheduling resources on the plurality of carriers or BWPs because the frequency-domain resource indication information supports scheduling of the plurality of carriers or BWPs. In this way, a plurality of carriers or BWPs can be scheduled by using one piece of DCI, effectively reducing PDCCH overheads in a scheduling process.

Figure 5:
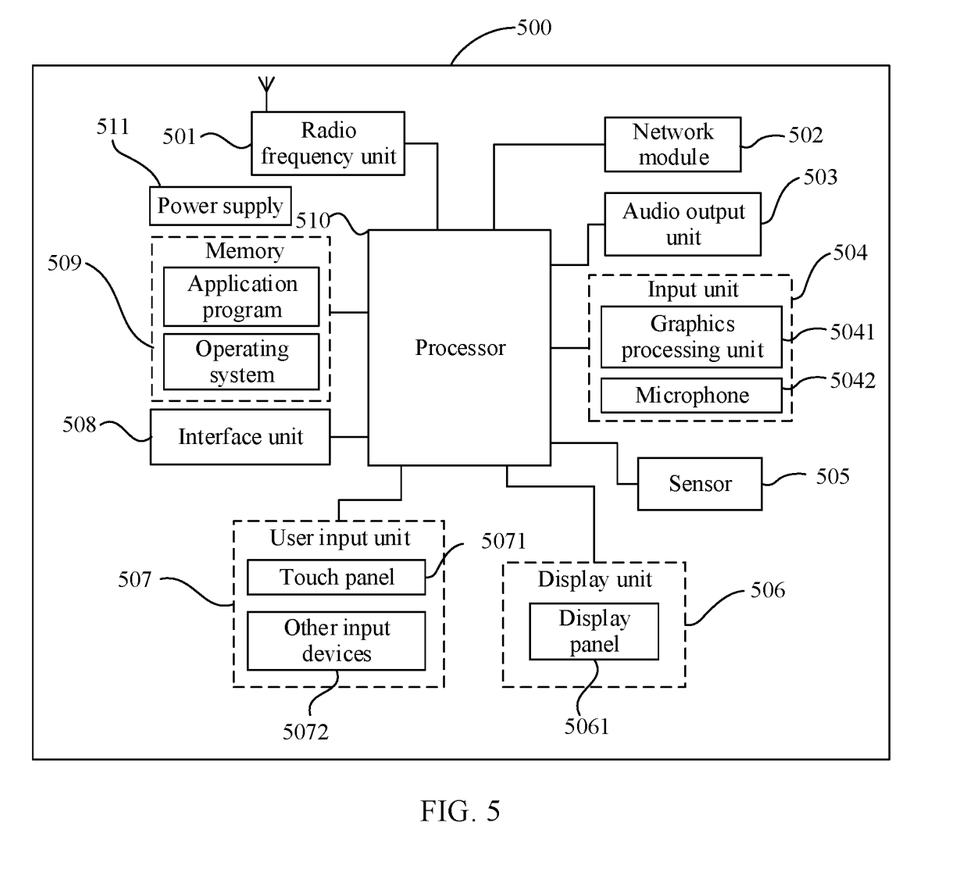
FIG. 5 is a schematic structural diagram of a user-side device according to another embodiment of the present application.

FIG. 5 is a schematic structural diagram of hardware of a user-side device for implementing the embodiments of the present application. The user-side device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art understands that the structure of the user-side device shown in FIG. 5 does not constitute any limitation on the user-side device. The user-side device may include more or fewer components than those shown in the figure, or some components may be combined, or the components may be disposed in different manners. In this embodiment of the present application, the user-side device includes but is not limited to a mobile phone, a tablet computer, a laptop computer, a palmtop computer, an in-vehicle terminal, a wearable device, a pedometer, and the like.

The processor 510 is configured to obtain frequency-domain resource indication information DCI, where the frequency domain resource indication information supports scheduling of a plurality of carriers or bandwidth parts BWPs; and determine frequency-domain scheduling resources on the plurality of carriers or BWPs according to the frequency-domain resource indication information.

It can be learned that after the user-side device obtains the frequency-domain resource indication information of the DCI, the frequency-domain scheduling resources on the plurality of carriers or BWPs can be determined because the frequency-domain resource indication information supports scheduling of the plurality of carriers or BWPs. In this way, a plurality of carriers or BWPs can be scheduled by using one piece of DCI, effectively reducing PDCCH overheads in a scheduling process.

It should be understood that in this embodiment of the present application, the radio frequency unit 501 may be configured to: receive and transmit signals in an information receiving/sending process or a call process; and exemplarily, after receiving downlink data from a base station, transmit the downlink information to the processor 510 for processing, and in addition, transmit uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may also communicate with a network and other devices via a wireless communications system.

The user-side device provides a user with wireless broadband internet access through the network module 502, for example, helping the user to send or receive an e-mail, to browse a web page, or to access streaming media.

The audio output unit 503 may convert audio data received by the radio frequency unit 501 or the network module 502 or stored in the memory 509 into an audio signal and output the audio signal as a sound. Furthermore, the audio output unit 503 may also provide audio output (for example, a call signal received sound or a message received sound) related to a specific function performed by the user-side device 500. The audio output unit 503 includes a speaker, a buzzer, a receiver, and the like.

The input unit 504 is configured to receive an audio or video signal. The input unit 504 may include a graphics processing unit (GPU) 5041 and a microphone 5042. The graphics processing unit 5041 processes image data of a still picture or a video obtained by an image capture apparatus (for example, a camera) in an image capture mode or a video capture mode. A processed image frame may be displayed on the display unit 506. The image frame processed by the graphics processing unit 5041 may be stored in the memory 509 (or another storage medium) or be transmitted by the radio frequency unit 501 or the network module 502. The microphone 5042 is capable of receiving sounds and processing such sounds into audio data. The processed audio data may be converted in a telephone call mode into a format that can be transmitted by the radio frequency unit 501 to a mobile communications base station, for outputting.

The user-side device 500 further includes at least one sensor 505, such as a light sensor, a motion sensor, and other sensors. Exemplarily, the light sensor includes an ambient light sensor and a proximity sensor. The ambient light sensor may adjust luminance of the display panel 5061 based on brightness of ambient light. The proximity sensor may turn off the display panel 5061 and/or backlight when the user-side device 500 is moved to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the user-side device, functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided to the user. The display unit 506 may include the display panel 5061. The display panel 5061 may be configured in a form of a liquid crystal display (LCD), an organic light-emitting diode (OLED), or the like.

The user input unit 507 may be configured to receive input digit or character information and generate key signal input related to user setting and function control of the user-side device. Exemplarily, the user input unit 507 may include a touch panel 5071 and other input devices 5072. The touch panel 5071 is also referred to as a touchscreen and can collect a touch operation (such as an operation performed by the user on the touch panel 5071 or near the touch panel 5071 with a finger or by using any proper object or accessory such as a stylus) of the user on or near the touch panel 5071. The touch panel 5071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 510, and can receive a command transmitted by the processor 510 and execute the command. In addition, the touch panel 5071 may be implemented in a plurality of forms, for example, as a resistive, capacitive, infrared, or surface acoustic wave touch panel. The user input unit 507 may further include the other input devices 5072 in addition to the touch panel 5071. Exemplarily, the other input devices 5072 may include but are not limited to a physical keyboard, a function key (such as a volume control key or an on/off key), a trackball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. Although in FIG. 5, the touch panel 5071 and the display panel 5061 act as two independent parts to implement input and output functions of the user-side device, in some embodiments, the touch panel 5071 and the display panel 5061 may be integrated to implement the input and output functions of the user-side device. This is not specifically limited herein.

The interface unit 508 is an interface connecting an external apparatus to the user-side device 500. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 508 may be configured to: receive input (for example, data information and power) from the external apparatus, and transmit the received input to one or more elements in the user-side device 500, or may be configured to transmit data between the user-side device 500 and the external apparatus.

The memory 509 may be configured to store software programs and various data. The memory 509 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 509 may include a high-speed random access memory, and may further include a non-volatile memory such as at least one disk storage device, a flash memory device, or another volatile solid-state storage device.

The processor 510 is a control center of the user-side device, and is connected to all components of the user-side device by using various interfaces and lines. By running or executing a software program and/or module that is stored in the memory 509 and calling data stored in the memory 509, the processor 510 executes various functions of the user-side device and processes data, so as to perform overall monitoring on the user-side device. The processor 510 may include one or more processing units. Optionally, the processor 510 may integrate an application processor and a modem processor. The application processor mainly processes the operating system, a user interface, an application program, and the like. The modem processor mainly processes wireless communication. It can be understood that the modem processor may alternatively be not integrated in the processor 510.

The user-side device 500 may further include the power supply 511 (such as a battery) supplying power to each component. Optionally, the power supply 511 may be logically connected to the processor 510 by using a power management system, so that functions such as charge and discharge management and power consumption management are implemented by using the power management system.

In addition, the user-side device 500 includes some functional modules that are not shown. Details are not described herein.

Preferentially, an embodiment of the present application further provides a communications device, including a processor, a memory, and a computer program stored in the memory and capable of running on the processor. When the computer program is executed by the processor, the processes of the foregoing resource determining method or the resource indication method are implemented, with the same technical effects achieved. To avoid repetition, details are not described herein again.

An embodiment of the present application further provides a computer-readable storage medium, where a computer program is stored in the computer-readable storage medium. When the computer program is executed by a processor, the processes of the foregoing resource determining method or the resource indication method are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present application essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present application.

The embodiments of the present application are described above with reference to the accompanying drawings, but the present application is not limited to the foregoing implementations. The foregoing embodiments are only illustrative rather than restrictive. Inspired by the present application, a person of ordinary skill in the art can still derive many variations without departing from the essence of the present application and the protection scope of the claims. All these variations shall fall within the protection of the present application.

What is claimed is:

1. A resource determining method, performed by a user-side device and comprising:
 obtaining frequency-domain resource indication information of downlink control information (DCI), wherein the frequency-domain resource indication information supports scheduling of a plurality of carriers; and
 determining frequency-domain scheduling resources on the plurality of carriers according to the frequency-domain resource indication information;
 wherein the obtaining frequency-domain resource indication information of downlink control information DCI comprises:
 determining, based on configuration information of candidate resources scheduled by the DCI, a first indicator field in the DCI that corresponds to the frequency-domain resource indication information, wherein the first indicator field is a frequency-domain resource allocation (FDRA) field; and
 obtaining the frequency-domain resource indication information based on the first indicator field;
 wherein the determining, based on configuration information of candidate resources scheduled by the DCI, a first indicator field in the DCI that corresponds to the frequency-domain resource indication information comprises:
 based on configuration information of carriers in the candidate resources, obtaining sizes of second indicator fields corresponding to the carriers; and
 determining a size of the first indicator field based on the sizes of the second indicator fields;
 wherein, in the first indicator field, subfields corresponding to carriers are arranged in an order of first identifiers, the first identifiers are cell identity IDs.

2. The method according to claim 1,
wherein the determining, based on configuration information of candidate resources scheduled by the DCI, a first indicator field in the DCI that corresponds to the frequency-domain resource indication information further comprises:
in a case that the candidate resource comprises a plurality of carrier groups, obtaining, based on configuration information of the plurality of carrier groups, sizes of third indicator fields corresponding to the carrier groups; and
determining a size of the first indicator field based on the sizes of the third indicator fields;
or
wherein the determining, based on configuration information of candidate resources scheduled by the DCI, a first indicator field in the DCI that corresponds to the frequency-domain resource indication information further comprises:
based on whether the DCI is for single-carrier scheduling, selecting a size of the first indicator field according to a preset policy.

3. The method according to claim 2, wherein the determining a size of the first indicator field based on the size of the second indicator fields comprises:
using a sum of the sizes of all the second indicator fields as the size of the first indicator field; or
using a size of a largest second indicator field in all the second indicator fields as the size of the first indicator field;
or
wherein the determining a size of the first indicator field based on the sizes of the third indicator fields comprises:
using a size of a largest third indicator field in all the third indicator fields as the size of the first indicator field; or
obtaining the size L of the first indicator field according to a formula $L=S_{MAX}*N$, wherein $S_{MAX}$ is a size of a largest single-carrier indicator field in the plurality of carrier groups, and N is the largest number of carriers in the plurality of carrier groups in the candidate resources; or
using a size of a largest single-carrier indicator field in the plurality of carrier groups as the size of the first indicator field;
or
wherein the preset policy comprises:
in a case that the DCI is for single-carrier scheduling, obtaining the size of the first indicator field based on configuration information of a scheduled carrier; and
in a case that the DCI is not for single-carrier scheduling, obtaining, based on configuration information of a plurality of carrier groups in the candidate resources, sizes of fourth indicator fields corresponding to carrier groups, and using a size of a largest fourth indicator field in all the fourth indicator fields as the size of the first indicator field; or using a size of a largest single-carrier indicator field in a plurality of carrier groups as the size of the first indicator field; or obtaining a size L' of the first indicator field according to a formula $L'=S'_{MAX}*N$, wherein $S'_{MAX}$ is a size of a largest single-carrier indicator field in the plurality of carrier groups, and N is the largest number of carriers in the plurality of carrier groups in the candidate resources.

4. The method according to claim 1, wherein, in the first indicator field,
high-order or low-order bits of subfields corresponding to carriers are assigned for respective frequency-domain resource indicators.

5. The method according to claim 1, wherein the obtaining the frequency-domain resource indication information based on the first indicator field comprises:
reducing the first indicator field based on a first threshold to obtain a fifth indicator field; and
obtaining the frequency-domain resource indication information from the fifth indicator field.

6. The method according to claim 5, wherein an allocation granularity of the frequency-domain scheduling resource is doubled with respect to the first threshold.

7. The method according to claim 1, wherein the frequency-domain resource indication information comprises:
a second identifier and/or an offset value, wherein the second identifier is an indication identifier of a frequency-domain resource.

8. The method according to claim 1, wherein the user-side device does not expect at least one of the following:
carriers in the candidate resources have different subcarrier spacings (SCSs);
carriers in the candidate resources have different frequency-domain allocation modes;
carriers in the candidate resources have different bandwidths or different quantities of physical resource blocks (PRBs);
carriers in the candidate resources have different virtual resource block (VRB) to PRB pattern configurations; or
carriers in the candidate resources scheduled by the DCI have different frequency hopping pattern configurations.

9. A resource indication method, performed by a network-side device and comprising:
generating downlink control information (DCI) carrying frequency-domain resource indication information, wherein the frequency domain resource indication information supports scheduling of a plurality of carriers; and
sending the DCI to a user-side device;
wherein the generating downlink control information DCI carrying frequency-domain resource indication information comprises:
determining, based on configuration information of candidate resources scheduled by the DCI, a first indicator field in the DCI that corresponds to the frequency-domain resource indication information, wherein the first indicator field is an FDRA field; and
obtaining, based on the first indicator field, the DCI carrying the frequency-domain resource indication information;
wherein the determining, based on configuration information of candidate resources scheduled by the DCI, a first indicator field in the DCI that corresponds to the frequency-domain resource indication information comprises:
based on configuration information of carriers in the candidate resources, obtaining sizes of second indicator fields corresponding to the carriers; and
determining a size of the first indicator field based on the sizes of the second indicator fields;
wherein, in the first indicator field, subfields corresponding to carriers are arranged in an order of first identifiers, the first identifiers are cell identity IDs.

10. The method according to claim 9,
wherein the determining, based on configuration information of candidate resources scheduled by the DCI, a first indicator field in the DCI that corresponds to the frequency-domain resource indication information further comprises:
in a case that the candidate resource comprises a plurality of carrier groups, obtaining, based on configuration information of the plurality of carrier groups, sizes of third indicator fields corresponding to the carrier groups; and
determining a size of the first indicator field based on the sizes of the third indicator fields;
or
wherein the determining, based on configuration information of candidate resources scheduled by the DCI, a first indicator field in the DCI that corresponds to the frequency-domain resource indication information further comprises:
based on whether the DCI is for single-carrier scheduling, selecting a size of the first indicator field according to a preset policy.

11. The method according to claim 10, wherein the determining a size of the first indicator field based on the sizes of the second indicator fields comprises:
using a sum of the sizes of all the second indicator fields as the size of the first indicator field; or
using a size of a largest second indicator field in all the second indicator fields as the size of the first indicator field;
or
wherein the determining a size of the first indicator field based on the sizes of the third indicator fields comprises:
using a size of a largest third indicator field in all the third indicator fields as the size of the first indicator field; or
obtaining the size L of the first indicator field according to a formula $L=S_{MAX}*N$, wherein $S_{MAX}$ is a size of a largest single-carrier indicator field in the plurality of carrier groups, and N is the largest number of carriers in the plurality of carrier groups in the candidate resources; or
using a size of a largest single-carrier indicator field in the plurality of carrier groups as the size of the first indicator field;
or
wherein the preset policy comprises:
in a case that the DCI is for single-carrier scheduling, obtaining the size of the first indicator field based on configuration information of a scheduled carrier; and
in a case that the DCI is not for single-carrier scheduling, obtaining, based on configuration information of a plurality of carrier groups in the candidate resources, sizes of fourth indicator fields corresponding to carrier groups, and using a size of a largest fourth indicator field in all the fourth indicator fields as the size of the first indicator field; or using a size of a largest single-carrier indicator field in a plurality of carrier groups as the size of the first indicator field; or obtaining a size L' of the first indicator field according to a formula $L'=S'_{MAX}*N$, wherein $S'_{MAX}$ is a size of a largest single-carrier indicator field in the plurality of carrier groups, and N is the largest number of carriers in the plurality of carrier groups in the candidate resources.

12. The method according to claim 9, wherein, in the first indicator field,
high-order or low-order bits of subfields corresponding to carriers are assigned for respective frequency-domain resource indicators.

13. The method according to claim 9, wherein the obtaining, based on the first indicator field, the DCI carrying the frequency-domain resource indication information comprises:
reducing the first indicator field based on a first threshold to obtain a fifth indicator field; and
adding the frequency-domain resource indication information to the fifth indicator field.

14. The method according to claim 13, wherein an allocation granularity of the frequency-domain scheduling resource of the DCI is doubled with respect to the first threshold.

15. The method according to claim 9, wherein the frequency-domain resource indication information comprises:
a second identifier and/or an offset value, wherein the second identifier is an indication identifier of a frequency-domain resource.

16. The method according to claim 9, wherein the user-side device does not expect at least one of the following:
carriers in the candidate resources have different subcarrier spacings (SCSs);
carriers in the candidate resources have different frequency-domain allocation modes;
carriers in the candidate resources have different bandwidths or different quantities of physical resource blocks (PRBs);
carriers in the candidate resources have different virtual resource block (VRB) to PRB pattern configurations; or
carriers in the candidate resources have different frequency hopping pattern configurations.

17. A communications device, comprising a processor, a memory, and a computer program stored in the memory and capable of running on the processor, wherein when the computer program is executed by the processor, the following process is implemented;
obtaining frequency-domain resource indication information of downlink control information (DCI), wherein the frequency domain resource indication information supports scheduling of a plurality of carriers; and
determining frequency-domain scheduling resources on the plurality of carriers according to the frequency-domain resource indication information;
wherein the obtaining frequency-domain resource indication information of downlink control information DCI comprises:
determining, based on configuration information of candidate resources scheduled by the DCI, a first indicator field in the DCI that corresponds to the frequency-domain resource indication information, wherein the first indicator field is a frequency-domain resource allocation (FDRA) field; and
obtaining the frequency-domain resource indication information based on the first indicator field;
wherein the determining, based on configuration information of candidate resources scheduled by the DCI, a first indicator field in the DCI that corresponds to the frequency-domain resource indication information comprises:
based on configuration information of carriers in the candidate resources, obtaining sizes of second indicator fields corresponding to the carriers; and determining a size of the first indicator field based on the sizes of the second indicator fields;

wherein, in the first indicator field, subfields corresponding to carriers are arranged in an order of first identifiers, the first identifiers are cell identity IDs.

18. A communications device, comprising a processor, a memory, and a computer program stored in the memory and capable of running on the processor, wherein when the computer program is executed by the processor, the steps of the resource indication method according to claim 9 are implemented.

19. The communications device according to claim 17, wherein when the computer program is executed by the processor, the following process is implemented:

using a sum of the sizes of all the second indicator fields as the size of the first indicator field; or using a size of a largest second indicator field in all the second indicator fields as the size of the first indicator field.

20. The communications device according to claim 17, wherein when the computer program is executed by the processor, the following process is implemented:

based on whether the DCI is for single-carrier scheduling, selecting a size of the first indicator field according to a preset policy.

* * * * *